(12) United States Patent
Rieger et al.

(10) Patent No.: US 11,338,235 B2
(45) Date of Patent: May 24, 2022

(54) FILTER DEVICE COMPRISING A FILTER ELEMENT IN A FILTER HOUSING

(71) Applicant: MANN+HUMMEL GmbH, Ludwigsburg (DE)

(72) Inventors: Mario Rieger, Ludwigsburg (DE); Pedro Miguel Pereira Madeira, Bietigheim-Bissingen (DE); Stefan Kunze, Tuebingen (DE); Ulrich Dehnen, Kornwestheim (DE); Johannes Stuerner, Aidlingen (DE); Markus Beylich, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 37 days.

(21) Appl. No.: 16/935,693

(22) Filed: Jul. 22, 2020

(65) Prior Publication Data
US 2020/0346154 A1 Nov. 5, 2020

Related U.S. Application Data

(63) Continuation of application No. PCT/EP2019/050172, filed on Jan. 4, 2019.

(30) Foreign Application Priority Data

Jan. 24, 2018 (DE) ...................... 10 2018 000 543.8

(51) Int. Cl.
*B01D 50/00* (2022.01)
*B01D 46/00* (2022.01)
(Continued)

(52) U.S. Cl.
CPC ......... *B01D 46/0045* (2013.01); *B01D 45/16* (2013.01); *B01D 46/0005* (2013.01);
(Continued)

(58) Field of Classification Search
CPC ................ B01D 46/0045; B01D 45/16; B01D 46/0005; B01D 46/2403; B01D 46/521;
(Continued)

(56) References Cited

U.S. PATENT DOCUMENTS 3,078,650 A * 2/1963 Anderson .......... B01D 46/2411
                                                     55/337
4,159,899 A * 7/1979 Deschenes ........... F02M 35/022
                                                     55/454
(Continued)

*Primary Examiner* — Dung H Bui

(57) ABSTRACT

A filter device is provided with a filter housing provided with a housing wall and with a filter element arranged in the filter housing. The filter element has an annular filter medium body and an end disk arranged at an end face of the filter medium body. The filter medium body surrounds in a ring shape an inwardly positioned flow space for receiving a fluid to be filtered. An annular circumferentially extending flow path is positioned between an outer contour of the end disk and an inner side of the housing wall of the filter housing. Guide vanes project into the annular circumferentially extending flow path. The guide vanes are fastened at the end disk at the filter element. A cover is arranged at the end disk at the filter element and covers a portion of the annular circumferentially extending flow path.

8 Claims, 3 Drawing Sheets

(51) Int. Cl.
    *B01D 45/16*    (2006.01)
    *B01D 46/24*    (2006.01)
    *B01D 46/52*    (2006.01)
    *B01D 50/20*    (2022.01)
    *F02M 35/02*    (2006.01)
    *F02M 35/024*    (2006.01)

(52) U.S. Cl.
    CPC ....... *B01D 46/2403* (2013.01); *B01D 46/521* (2013.01); *B01D 50/20* (2022.01); *B01D 2275/208* (2013.01); *B01D 2279/60* (2013.01); *F02M 35/0201* (2013.01); *F02M 35/02433* (2013.01)

(58) Field of Classification Search
    CPC ............ B01D 50/002; B01D 2275/208; B01D 2279/60; B01D 46/2414; B01D 46/0004; B01D 46/0041; F02M 35/0216; F02M 35/0201; F02M 35/0223; F02M 35/02483
    See application file for complete search history.

(56) References Cited

U.S. PATENT DOCUMENTS

| | | | |
|---|---|---|---|
| 4,227,898 A | 10/1980 | Kamekawa et al. | |
| 4,373,940 A * | 2/1983 | Petersen | B01D 45/14 55/328 |
| 4,459,141 A * | 7/1984 | Burrington | F02M 35/022 55/391 |
| 5,549,722 A * | 8/1996 | Zemaitis | B01D 46/2411 55/320 |
| 7,001,440 B1 | 2/2006 | Chilton | |
| 9,745,924 B2 * | 8/2017 | Navaliger | F02M 35/0223 |
| 2004/0035097 A1 * | 2/2004 | Schlensker | B01D 46/2414 55/498 |
| 2007/0251199 A1 | 11/2007 | Valentini | |
| 2011/0252964 A1 * | 10/2011 | Wahlquist | B01D 46/48 95/20 |
| 2013/0232928 A1 * | 9/2013 | Heim | B01D 46/0043 55/418 |
| 2014/0208701 A1 * | 7/2014 | Neu | B01D 45/12 55/318 |
| 2015/0068169 A1 * | 3/2015 | Schulz | B01D 45/12 55/337 |
| 2015/0176544 A1 * | 6/2015 | Kaufmann | B01D 46/0023 55/425 |
| 2016/0296867 A1 | 10/2016 | Stark et al. | |
| 2017/0291129 A1 * | 10/2017 | Sorger | B01D 46/521 |
| 2018/0036746 A1 * | 2/2018 | Antomon | B04C 5/08 |
| 2018/0290153 A1 * | 10/2018 | Bannister | B01D 46/106 |
| 2019/0060814 A1 * | 2/2019 | Donauer | B01D 46/2411 |
| 2019/0070548 A1 * | 3/2019 | Franz | B01D 46/2414 |
| 2019/0134546 A1 * | 5/2019 | Neef | B01D 46/521 |

\* cited by examiner

FILTER DEVICE COMPRISING A FILTER ELEMENT IN A FILTER HOUSING

CROSS-REFERENCE TO RELATED APPLICATIONS

This application is a continuation application of international application No. PCT/EP2019/050172 having an international filing date of 4 Jan. 2019 and designating the United States, the international application claiming a priority date of 24 Jan. 2018 based on prior filed German patent application No. 10 2018 000 543.8, the entire contents of the aforesaid international application and the aforesaid German patent application being incorporated herein by reference.

BACKGROUND OF THE INVENTION

The invention concerns a filter device with a filter element in a filter housing, wherein the filter element comprises an annular filter medium body, wherein an end disk is arranged at an end face of the filter medium body, wherein the filter medium body surrounds in a ring shape an inwardly positioned flow space for receiving a fluid to be filtered.

U.S. Pat. No. 3,816,982 describes an air filter with a hollow-cylindrical filter element in a receiving filter housing. The air to be filtered is introduced via an inflow opening, arranged laterally in the filter housing and axially upstream of the filter element, and flows subsequently through the filter element radially from the exterior to the interior. The filter element comprises at its oppositely positioned end faces an open and a closed end disk. The purified air is discharged axially from the interior of the hollow-cylindrical filter element via the open end disk.

In DE 10 2013 015 052 A1, a filter device for purifying a gas flow is described that comprises a hollow-cylindrical filter element and an also hollow-cylindrical preseparator that surrounds the filter element and at whose outer side guide vanes are arranged, distributed about the circumference. The supplied gas flow experiences at the guide vanes a deflection and acceleration which leads to separation of coarse contaminants such as dirt and dust particles.

DE 10 2010 049 411 A1 discloses a filter element for an air inlet system with a filter medium body for purifying raw air. The filter medium body is embodied as a hollow body with elongate cross-sectional shape and comprises end disks at its axial end faces. Along a narrow side of the filter medium body, guide vanes are arranged axially distributed that serve for flow guiding in the inflow region.

SUMMARY OF THE INVENTION

It is the object of the invention to configure a filter device with a filter element comprising an annular filter medium body with simple constructive measures in such a way that dirt particles are effectively separated from the fluid flow to be filtered prior to flowing through the filter medium body.

This object is solved according to the invention in that, between the outer contour of the end disk and the inner side of a housing wall of the filter housing, an annular circumferentially extending flow path is positioned into which, in sections thereof, guide vanes project that are fastened at the end disk at the filter element, wherein a portion of the flow path is covered by a cover which is arranged at the end disk at the filter element.

The dependent claims provide expedient further embodiments.

The filter device according to the invention comprises a filter housing and a filter element received in the filter housing with an annular filter medium body at which the filtration of a fluid to be purified takes place. The filter device is used in particular for gas filtration, for example, for filtration of the combustion air to be supplied to an internal combustion engine. In principle, however, a use for liquid fluids is conceivable also.

The annular filter medium body of the filter element is flowed through by the fluid to be purified in radial direction, in particular radially from the exterior to the interior, so that the outer side of the filter medium body is the inflow side or raw side and the inwardly positioned side the clean side. In principle, a reverse flow through the filter medium body radially from the interior to the exterior is also conceivable. The filter medium body is in particular of an annular closed configuration and comprises an inwardly positioned flow space for the fluid. In case of a flow through the filter medium body radially from the exterior to the interior, the purified fluid is axially discharged from the inwardly positioned flow space.

An end face of the annular closed filter medium body is provided with a closed end disk that axially closes off the inwardly positioned flow space at this location. Adjacent to an end disk at an end face of the filter medium body, a plurality of guide vanes are arranged which extend radially relative to the longitudinal axis of the filter element past the outer contour of the end disk and project into a flow path that is upstream of the inflow side of the filter medium body.

The guide vanes are located preferably adjacent to the end disk that is of a closed embodiment at the filter medium body. In addition or as an alternative, it is also possible to arrange guide vanes adjacent to an axially oppositely positioned open end disk. Via the open end disk, fluid can be axially discharged out of the inwardly positioned flow space in the filter medium body or, in case of a radial flow through the filter medium body from the interior to the exterior, introduced axially into the inwardly positioned flow space.

The guide vanes project with sections thereof into an annular circumferentially extending flow path that is formed between the outer contour of the end disk and the inner side of a housing wall of the receiving filter housing. The annular circumferentially extending flow path follows the outer contour of the end disk that comprises the same cross-sectional geometry as the filter medium body.

The guide vanes do not extend in circumferential direction across the entire annular circumferentially extending flow path but project only across a portion of the circumference of the flow path into the latter. A further portion of the circumference of the flow path is covered by a cover which at this location prevents a flow of the fluid therethrough. The cover forces the fluid to flow along the flow path in the portion which is not covered by the cover and into which the guide vanes are projecting. The fluid flow experiences a flow acceleration due to the reduction of the free cross section available for the flow. Also, the fluid flow, even before passing the annular circumferentially extending flow path, is imparted with a swirl which enhances separation of entrained dirt particles in the fluid at the inner side of the housing wall of the filter housing. The cover extends advantageously across a significant portion of the annular circumferentially extending flow path, for example, across at least 10% or 20% of the length of the flow path in circumferential direction.

The annular filter medium body of the filter element comprises, according to a further advantageous embodiment, an elongate cross-sectional shape. The inwardly positioned flow space is enclosed by longitudinal sides and narrow sides of the filter medium body. The cross-sectional shape of the filter medium body can be oval or ovalized. Non-oval elongate cross-sectional shapes are also conceivable, for example, concavely curved longitudinal sides or straight-surfaced, flat longitudinal sides or non-oval curved convex longitudinal sides. The extension of the longitudinal sides is larger than the extension of the narrow sides; for example, it can be expedient that the extension of the longitudinal sides is at least twice as large as the extension of the narrow sides. The narrow sides are provided, for example, with a semi-circular cross-sectional shape.

The elongate cross-sectional shape of the filter medium body or of the filter element has the advantage that installation spaces that are of a relatively low height can be used. Also, a large inflow surface is provided at the longitudinal sides of the filter medium body at which identical or at least similar flow conditions are present.

As an alternative to an elongate annular cross-sectional shape, it is also possible that the filter medium body has a circular cross-sectional shape.

In case of an elongate cross-sectional shape of the filter medium body or of the filter element, it can be expedient that the cover covers a narrow side of the annular flow path. The oppositely positioned narrow side as well as the longitudinal sides or the greater portion of the longitudinal sides are however not covered; into these portions of the flow path, the guide vanes can project wherein one or a plurality of sections of the flow path without cover can be completely free of guide vanes, as needed.

Even for a circular cross-sectional shape of the filter medium body, a significant portion of the annular circumferentially extending flow path at the outer contour of the end disk of the filter element is covered by the cover. The cover can extend, for example, across an angular segment up to maximally 180°, maximally 120°, maximally 90°, maximally 60°, maximally 45° or less than 45°.

According to yet another expedient embodiment, an inflow opening is provided in the filter housing upstream of the filter element through which the fluid to be purified is introduced. The inflow opening can be arranged in the filter housing laterally or radially displaced relative to the longitudinal axis of the filter element. In a preferred embodiment, the inflow opening and the cover in the circumferential flow path at the outer contour of the end disk of the filter element are located at the same side. Accordingly, the fluid which is flowing through the inflow opening into the filter housing is forced to flow past the cover which is positioned in the flow path between the inflow opening and the filter medium body. In this context, the fluid is partially deflected at the cover and is guided in the direction toward the exposed flow path as well as the guide vanes arranged therein which influence the fluid flow.

The fluid flow is in particular imparted with a swirl which is beneficial to the separation of dirt particles entrained in the fluid. The fluid flow imparted with a swirl begins to circulate in particular in circumferential direction so that the entrained dirt particles in the fluid are transported outwardly and can separate at the inner side of a housing wall. This housing wall is in particular the outer wall of a filter housing receiving the filter element.

Advantageously, the guide vanes are uniformly distributed about the circumference of the end disk that is not covered by the cover. As an alternative thereto, it is also possible to provide a non-uniform distribution of the guide vanes in that, for example, a section along the cover-free circumference of the end disk remains free of guide vanes and forms a free flow cross section at this location. In this way, it is possible to additionally influence the fluid flow that is supplied to the inflow side of the filter medium body.

The guide vanes can be fastened at the filter element, in particular at the end disk adjacent to which the guide vanes extend in radial direction outwardly. It can be advantageous to design the guide vanes such that the free end face of the guide vanes is positioned at an axial distance to the end disk, for example, is displaced axially relative to the end disk in the direction toward the filter medium body or, in opposite direction, farther removed axially from the end disk and thus axially positioned outside of the filter medium body. According to a further expedient embodiment, the guide vanes are positioned axially at least approximately at the same level as the end disk.

As an alternative to an attachment of the guide vanes at the end disk, it is also possible to fasten the guide vanes at another component of the filter element, for example, at a support frame with which the filter medium body is lined in particular at its inner side. Moreover, it is possible to arrange the guide vanes at the filter housing.

The filter element and the filter medium body can have across the axial length, relative to the longitudinal axis of the filter element, a non-constant cross section that changes from one end face to the oppositely positioned end face. For example, the cross section increases from the closed end disk to the oppositely positioned open end disk.

As an alternative to a non-constant cross section, filter elements or filter medium bodies with a constant cross section across the length are possible also, for example, in the form of a hollow cylinder with circular or non-round cross section.

According to a further advantageous embodiment, one or a plurality of guide vanes comprise a curved flow guiding section. The curved flow guiding section imparts a desired swirl to the impinging fluid flow. In an embodiment of the filter medium body with elongate cross-sectional shape, the guide vanes with the curved flow guiding section are advantageously located in the region of the narrow side of the filter medium body.

According to a further advantageous embodiment, one or a plurality of guide vanes comprise a straight or at least approximately straight flow guiding section. The latter is located preferably at the longitudinal sides of the filter medium body in an embodiment of the filter medium body with elongate cross-sectional shape. The straight and at least approximately straight flow guiding section adjoins in particular a fastening section of the guide vane by means of which the guide vane is fastened at the filter element. An angle between 10° and 80°, for example, between 30° and 60°, is preferably present between the flow guiding section and the fastening section of the guide vane.

The cover is arranged at the filter element at the end disk.

The cover as well as the guide vanes are arranged at the end disk, in particular at the closed end disk.

The invention concerns moreover a filter element for a filter device wherein the filter element is insertable optionally into an afore described filter device. The filter element comprises an annular filter medium body with an end disk at an end face of the filter medium body. A radially outwardly extending cover is arranged at the filter element and extends about a portion of the circumference of the end disk. The further portion of the circumference at the end disk is however not covered by the cover and forms a flow path for the fluid that is to be supplied to the filter medium body for the filtration.

In a further advantageous embodiment, the filter medium body is of a folded configuration wherein the length extension of the filter folds extends in axial direction, relative to the longitudinal axis of the filter element.

According to an advantageous embodiment, at the inflow side of the filter medium body a flow-tight separation element is provided which extends across a partial surface of the filter medium body. The flow-tight separation element prevents or reduces at least an inflow into the filter medium body in this section so that a flow calming action of the raw fluid at the inflow side of the filter medium body is achieved.

The separation element is embodied, for example, as a calming wall or as a separation film and prevents that the fluid to be purified flows at the inflow side at the position of the separation element immediately through the filter medium body. The unpurified raw fluid guided in the direction toward the inflow side is prevented from immediately flowing through the filter medium body at the position of the separation element and is therefore forced to reside in the space at the inflow side of the filter medium body for at least a slightly longer period of time, which entails a flow calming action. Subsequent thereto, the unpurified fluid can flow through the filter medium body. The flow calming action has the result that larger dirt particles entrained in the raw fluid can deposit in the space that is upstream of the inflow side of the filter medium body. Therefore, a preseparation is taking place wherein the separated particles advantageously can be discharged via a discharge valve from the filter housing. Due to the preseparation, the dirt load of the filter medium body is reduced.

According to an advantageous embodiment, the separation element is located at the filter housing in which the filter element with the filter medium body is received. The separation element can be embodied, as needed, as one piece together with the filter housing. For example, the separation element is a calming wall which surrounds the filter medium body in a ring shape and comprises a distance relative to the outer side of the filter medium body.

According to a further advantageous embodiment, the separation element is arranged immediately at the filter element, for example, is applied to the outer side of the filter medium body. For example, the separation element is a separation film which is applied immediately onto the outer side of the filter medium body. In the region of the separation film, no immediate radial inflow into the filter medium body is possible. In a folded configuration of the filter medium body, the separation film is resting on the outer edges of the filter folds, wherein spreading of raw fluid at the inflow side is possible along the longitudinal extension of the filter folds. In this way, raw fluid which radially enters at a location of the filter medium body without such a separation film can be guided along the longitudinal extension of the folds axially to the region in which the separation film is located whereupon the filter medium body is radially flowed through in this section also. In this way, the section of the filter medium body which is covered by the separation film can also be used for filtration.

In a further advantageous embodiment, it is possible to provide a separation element in the form of a housing-associated calming wall as well as a further separation element in the form of a filter element-associated separation film. These two separation elements are located in particular at axially oppositely positioned sides of the filter medium body of the filter element.

In any case, it is expedient that the separation element, or the sum of all separation elements, extends only across a partial surface at the inflow side of the filter medium body so that a further partial section at the inflow side of the filter medium body remains free of such a separation element.

According to yet another advantageous embodiment, the separation element extends, beginning at an axial end face of the filter medium body, in axial direction as well as completely in circumferential direction of the filter medium body. The axial extension of the calming element is however in any case less than the axial total length of the filter medium body so that a partial section of the filter medium body remains free of the separation element. Advantageously, the axial extension of a separation element is maximally as large as half the axial total length of the filter medium body, for example, maximally only as large as a third of the axial total length of the filter medium body.

In case of a separation film as a separation element, it is expedient that the separation film is connected fixedly to the filter medium body, for example, by gluing or by welding.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
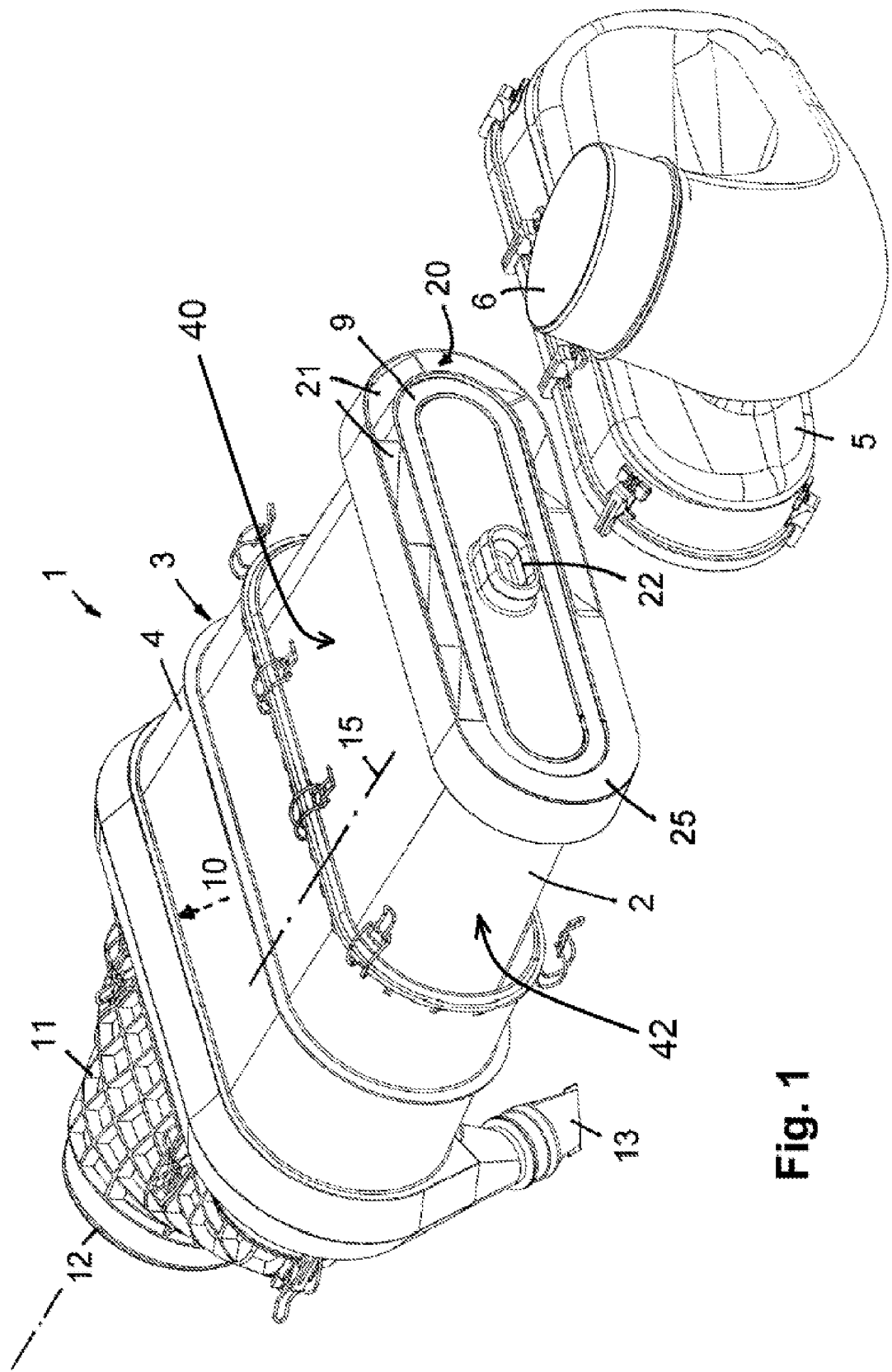
FIG. 1 shows in perspective exploded illustration a filter device as an air filter for an internal combustion engine, with a filter element with elongate cross-sectional shape in a filter housing and with guide vanes in the flow path between an inflow opening in the filter housing and a filter medium body of the filter element, wherein a portion of the flow path is covered by a cover.
Figure 2:
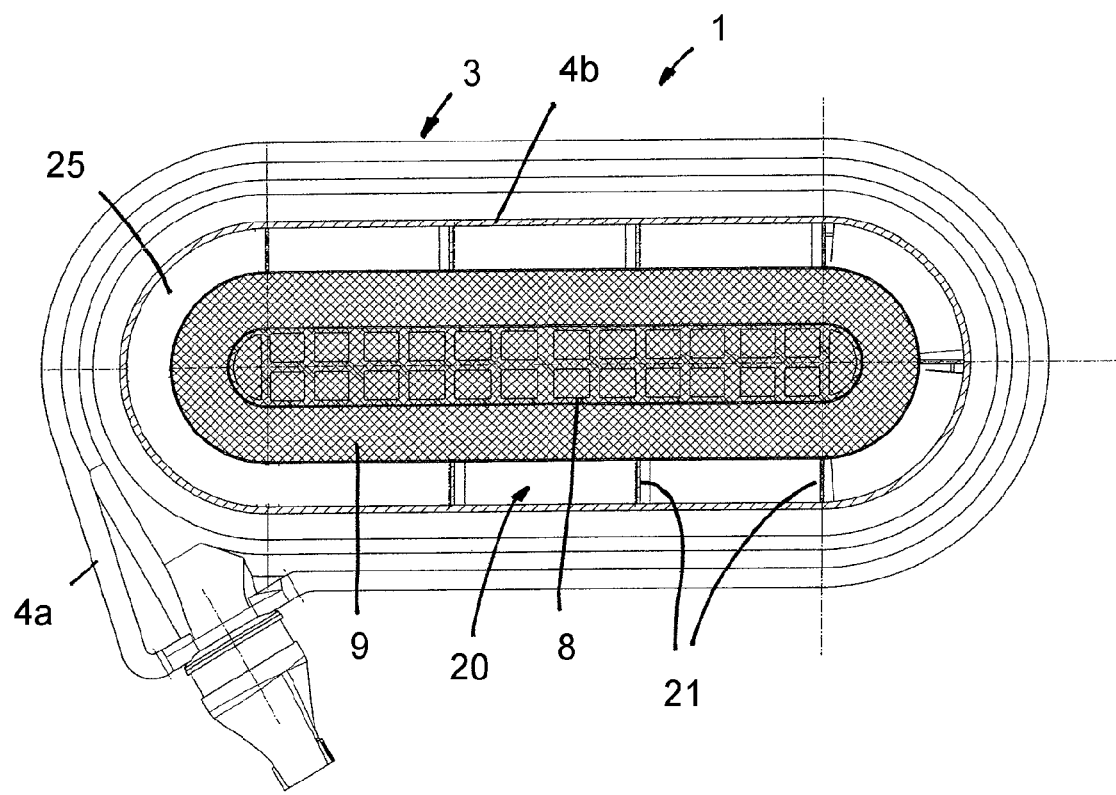
FIG. 2 shows the embodiment of FIG. 1 in section transverse to the longitudinal axis of the filter element.
Figure 3:
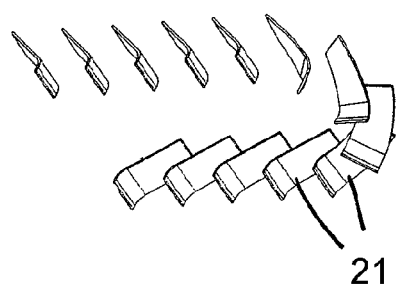
FIG. 3 shows a plurality of guide vanes in perspective view.

In the illustrated embodiment, a filter device 1 is illustrated that is embodied as an air filter in an intake manifold of an internal combustion engine for filtration of the combustion air to be supplied to the cylinders of the internal combustion engine. The filter device 1 comprises a filter element 2 that comprises an elongate, oval cross-sectional shape and is arranged in a filter housing 3 with a filter base housing 4 and an upstream inlet housing 5. The filter base housing 4 receives the filter element 2. In the inlet housing 5 that is to be connected to the filter base housing 4, a laterally arranged inflow opening 6 is provided via which the combustion air is introduced into the filter housing 3 and is guided in the direction toward the filter element 2. Relative to a central longitudinal axis 15 of the filter element 2, the inflow opening 6 is laterally or radially displaced wherein the inflow axis of the inflow opening 6 is positioned at an angle of approximately 90° relative to the central longitudinal axis 15 of the filter element 2.

The filter element 2 comprises a filter medium body 7 which is embodied in an annular closed configuration and provided with an elongate oval cross-sectional shape. Relative to the central longitudinal axis 15, the filter medium body 7 is flowed through in radial direction from the exterior to the interior by the fluid to be filtered, the combustion air, so that the outer side of the filter medium body 7 forms the raw side or inflow side and the inner side the clean side. The filter medium body 7 is lined at its inner side or clean side by a support frame 8 which is comprised of plastic material. The inwardly positioned flow space in the filter medium body 7 forms the clean space in which the purified fluid is collected and from which the purified fluid is axially discharged.

At the two oppositely positioned end faces of the filter element 2, an end disk 9, 10 is arranged, respectively, wherein the first end disk 9 neighboring the inflow opening 6 is embodied in a closed configuration and the second oppositely positioned end disk 10 facing away from the inflow opening 6 is embodied in an open configuration so that the fluid can flow axially out of the inwardly positioned clean space via the open end disk 10. Adjacent to the open end disk 10 of the filter element 2, a housing-associated outlet section 11 adjoins the filter base housing 4 and comprises an outflow opening 12 via which the purified fluid is discharged from the filter device 1.

The cross-sectional shape of the filter element 2 or of the filter medium body 7 is elongate wherein the longitudinal sides are flat and extend parallel to each other and are connected by curved narrow sides. The extension of the longitudinal sides is at least twice as large as the distance bridged by the narrow sides, i.e., the distance between the two longitudinal sides. Across the axial length, relative to the central longitudinal axis 15, the filter element 2 and the filter medium body 7 comprise a non-constant cross section which in the region of the closed end disk 9 is smaller than in the oppositely positioned region with the open end disk 10 and increases continuously and uniformly from the smaller to the larger cross section.

Adjacent to the housing-associated outlet section 11, at the filter base housing 4 a discharge valve 13 is arranged via which deposited dirt particles can be discharged from the filter housing.

At the outer side of the closed end disk 9, a centrally positioned support sleeve 22 is integrally formed with which the filter element 2 can be axially supported from the exterior. For this purpose, the inlet housing 5 is provided with a recess that is axially aligned with the support sleeve 22 and enables the insertion of a support rod that engages the support sleeve 22.

The combustion air which is introduced through the inlet opening 6 flows in the direction toward the flow passage 20 that is located between the outer circumference of the closed end disk 9 at the filter medium body 7 and the inner side of the outer wall of the filter base housing 4 which receives the filter element 2. In the flow passage 20, guide vanes 21 are arranged against which the combustion air, flowing in the direction toward the filter medium body 7, impinges and is imparted with a swirl. In this way, the air flow in the annular space between the inner side of the outer wall of the filter base housing 4 and the filter medium body 7 is caused to move in a circulating circumferential movement so that entrained dirt particles are separated at the inner side of the outer wall of the housing. The deposited dirt particles can be discharged through the discharge valve 13 from the filter housing 3.

In the mounted state, the guide vanes 21 are arranged completely inside the filter base housing 4.

The flow path 20 which extends between the outer contour of the end disk 9 and the inner side of the surrounding housing wall of the filter housing part 4 is embodied in an annular circumferential configuration and comprises only in one portion of its length the guide vanes 21. Across a further portion, the flow path 20 is covered by a cover 25 which extends completely across a narrow side and partially still along one of the two longitudinal sides. In this way, the free portion of the flow path that is available for passing of the flow is reduced.

The cover 25 is arranged relative to the longitudinal axis 15 on the same side as the inflow opening 6 in the inlet housing 5.

Due to the cover 25, the incoming fluid is forced to follow the free available flow path in which the guide vanes 21 are located. Accordingly, the flow concentrates on that portion of the flow path 20 in which the guide vanes 21 are located whereby the fluid mass flow is increased which impinges on the guide vanes 21 or passes through the flow path 20 between neighboring guide vanes 21. The fluid flow is imparted with an increased swirl so that the separation of entrained dirt particles is improved.

The cover 25 is connected to the filter element 2, in particular to the end disk 9 of closed configuration. Likewise, the guide vanes 21 can be arranged at the filter element, in particular at the end disk 9. However, further possibilities of arranging and fastening cover 25 and guide vanes 21 are possible. For example, it is conceivable that the cover 25 is arranged at the filter base housing 4 and the guide vanes 21 at the filter element 2 or at the end disk 9. Moreover, also embodiments are possible in which the cover 25 as well as the guide vanes 21 are arranged at the filter base housing 4. Finally, it is also conceivable that the cover 25 is arranged at the filter element 2 or at the end disk 9 and the guide vanes 21 at the filter base housing 4.

The guide vanes 21 are fixedly connected to the closed end disk 9 and project in radial direction past the outer contour of the end disk 9. Advantageously, the guide vanes 21 extend all the way to the inner side of the outer wall of the receiving filter base housing 4.

Figure 4:
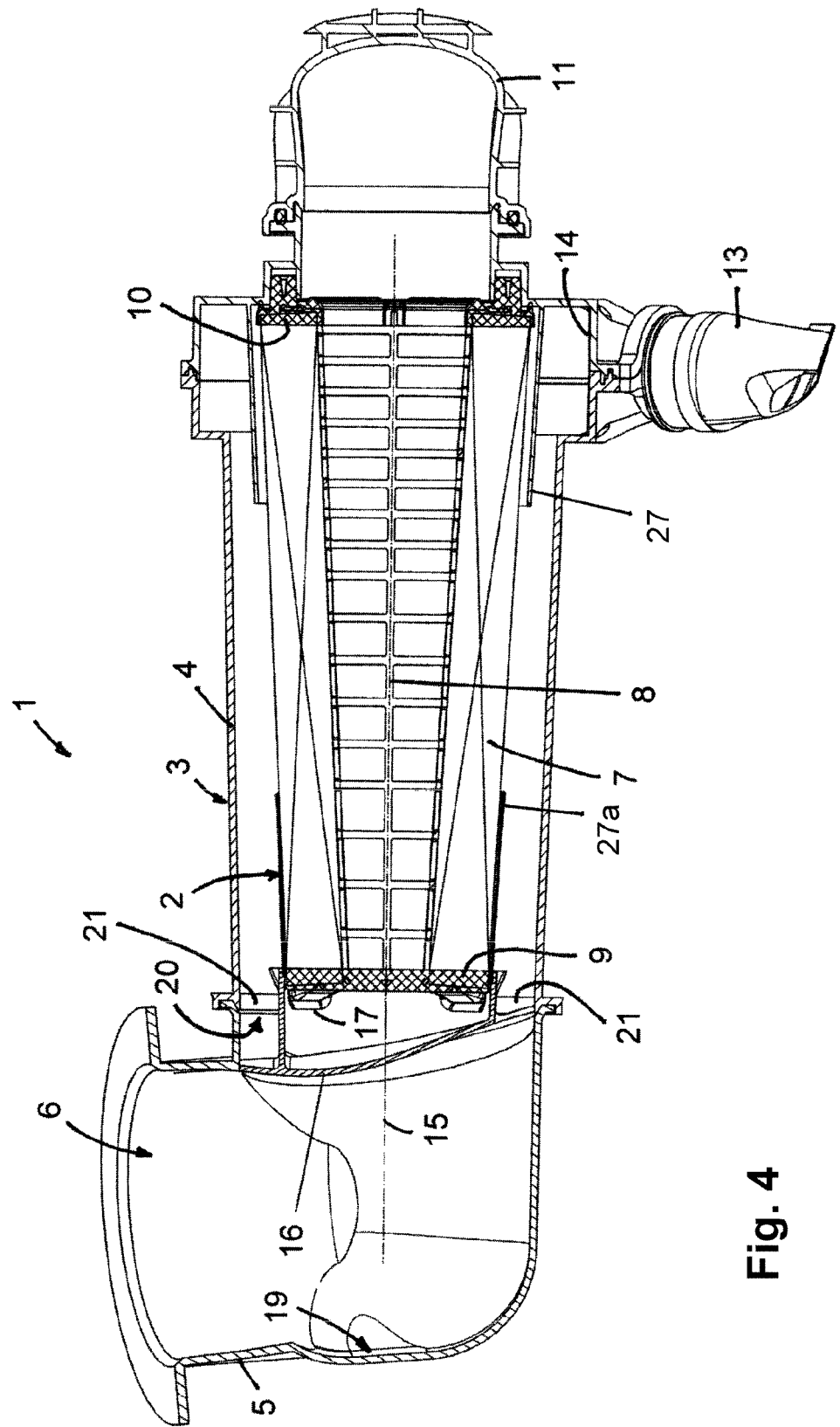
FIG. 4 shows a filter device embodied as an air filter in an embodiment variant.

In FIG. 4, an embodiment variant of a filter device 1 embodied as an air filter is illustrated. The filter device 1 according to FIG. 4 comprises a filter element 2 which is embodied hollow cylindrically or with elongate cross-sectional shape and arranged in a filter housing 3 which comprises a filter base housing 4 and an upstream inlet housing 5. The filter base housing 4 and the inlet housing 5 at which an inflow opening 6 is located are of a one-piece configuration. The filter base housing 4 accommodates the filter element 2 in its receiving space 26. The combustion air to be filtered is introduced via the laterally arranged inflow opening 6 into the filter housing 3 and guided in the direction toward the filter element 2. Relative to the central longitudinal axis 15 of the filter element 2, the inflow opening 6 is positioned laterally or radially displaced wherein the inflow axis of the inflow opening 6 is positioned at an angle of approximately 90° relative to the central longitudinal axis 15 of the filter element 2.

The filter element 2 comprises a filter medium body 7 which is embodied in an annular closed embodiment and provided with an elongate cross-sectional shape. Relative to its central longitudinal axis 15, the filter medium body 7 is flowed through in radial direction from the exterior to the interior by the fluid to be filtered, the combustion air, so that the outer side of the filter medium body 7 forms the raw side or inflow side and the inner side the clean side. The filter medium body 7 is lined at its inner side or clean side by a support frame 8 which is comprised of plastic material. The inwardly positioned flow space in the filter medium body 7 forms the clean space in which the purified fluid is collected and from which the purified fluid is axially discharged.

At both oppositely positioned end faces of the filter medium body 7, an end disk 9, 10 is arranged, respectively, wherein the first end disk 9 neighboring the inflow opening 6 is embodied in a closed configuration and the second oppositely positioned end disk 10 facing away from the inflow opening 6 is embodied in an open configuration so that the fluid can flow axially out of the inwardly positioned clean space via the open end disk 10. Adjacent to the open end disk 10 of the filter element 2, a housing-associated outlet section 11 adjoins the filter base housing 4 and comprises an outflow opening 12 via which the purified fluid is discharged from the filter device 1. The outlet section 11 is embodied separate from the filter base housing 4 but is connected to the filter base housing 4.

The cross-sectional shape of the filter element 2 or of the filter medium body 7 can be embodied elongate wherein the longitudinal sides in an exemplary fashion extend flat and parallel to each other and are connected by curved narrow sides. However, a circular cross-sectional shape of the filter element 2 and of the filter medium body 7 is also possible.

The filter element 2 and the filter medium body 7 have across the axial length, relative to the central longitudinal axis 15, a non-constant cross section that is smaller in the region of the closed end disk 9 than in the oppositely positioned region with the open end disk 10 and increases continuously and uniformly from the smaller to the larger cross section.

Adjacent to the housing-associated outlet section 11, in the filter base housing 4 a radially expanded annular space 14 is provided which forms a dirt collecting region and at which a discharge valve 13 is arranged. In the radially expanded dirt collecting region 14 which is of an annular embodiment, the separated dirt particles can collect which can be discharged via the discharge valve 13 from the filter housing 3.

The discharge valve 13 is preferably embodied as a passive valve that can be adjusted by external influences from the usually closed position into an open position in which the dirt particles can be discharged. For example, it is possible to connect the discharge valve 13 to a vacuum source, e.g., to a vacuum side of a cooling fan in a vehicle, so that the discharge valve 13 is opened at sufficiently high vacuum.

The dirt collecting region 14 communicates with the receiving space 26 at the raw or inflow side of the filter medium body 7. The dirt collecting region 14 is located axially adjacent to the end disk 10 of open configuration at the outflow side of the filter element 2. Relative to the axial total length of the filter element 2, the dirt collecting region 14 extends across an axial partial length that amounts to not more than 20% of the total length of the filter element 2. The dirt collecting region 14 is radially expanded relative to the immediately adjoining housing wall of the filter base housing 4. At the axial center of the dirt collecting chamber 14, the filter base housing 4 and the outlet section 11 of the housing abut each other.

In radial direction, the dirt collecting region 14 is separated by a separation element 27 from the filter medium body 7 wherein the separation element 27 is embodied as a circumferentially extending conically embodied calming wall 27 which is part of the filter housing 3. The calming wall 27 forms the radially inwardly positioned boundary wall of the dirt collecting chamber 14. The calming wall 27 extends circumferentially all around and is positioned at a minimal distance relative to the inflow side or raw side of the filter medium body 7. In axial direction, the calming wall 27 extends from an end face section of the filter housing 3, in particular of the outlet section 11, at the level of the end disk 10 past the axial extension of the dirt collecting region 14.

The axial length of the calming wall 27 amounts to, for example, at least one fourth of the axial total length of the filter element 2. The calming wall 27 provides for a flow calming action in this axial section in the receiving space 26 and reduces in this section the inflow into the filter medium body 7. The dirt collecting region 14 is in flow communication with the receiving space 26.

Due to the flow calming action and the larger radial extension of the dirt collecting region 14 in comparison to the immediately neighboring housing wall of the filter base housing 4, dirt particles can deposit in the dirt collecting region 14 and are subsequently discharged via the discharge valve 13.

The calming wall 27 is located axially adjacent to the open end disk 10 and extends in axial direction, beginning at the open end disk 10, across a partial region of the filter medium body 7.

The axially oppositely positioned side is provided with a further separation element 27a in the form of a separation film which is applied immediately onto the filter medium body 7. The separation film 27a extends, beginning at the closed end disk 9, in axial direction so that the calming wall 27 and the separation film 27a extend from oppositely positioned end faces axially in the direction toward the center of the filter medium body 7. The axial length of the calming wall 27 and of the separation film 27a is at least approximately of the same size. At the center between the two separation elements 27 and 27a, a partial section of the filter medium body 7 is provided which is free of separation elements and thus can immediately receive radially incoming flow of the raw fluid to be purified.

Both separation elements 27 and 27a provide for a flow calming action of the raw fluid flowing into the inflow space at the inflow side of the filter medium body so that it is possible that coarse dirt particles deposit in the annular space 14 and can be discharged via the discharge valve 13. Despite the separation elements 27 and 27a, the raw fluid can flow into the filter medium body 7 across its entire axial length and its entire inflow side. The calming wall 27 is positioned radially at a distance to the inflow side of the filter medium body 7 so that an annular space is formed between the calming wall 27 and the inflow side of the filter medium body into which the raw fluid can flow.

The filter medium body 7 is of a folded configuration wherein the longitudinal extension of the folds extends parallel to the longitudinal axis 15 of the filter element. In the region of the calming film 27a that is applied immediately onto the filter medium body 7 and, for example, is welded or glued to the filter medium body 7, the raw fluid can flow along the folds of the filter medium body 7, beginning at the partial section of the filter medium body without separation element, axially into the partial region which is covered by the separation film 27a. In this way, the filter medium body 7 is available for filtration of the raw fluid even in the region of the separation film 27a.

What is claimed is:

1. A filter device comprising:
    a filter housing comprising
        a housing wall circumferentially enclosing a receiving chamber of the filter housing;
    a filter element arranged in the receiving chamber of the filter housing (3);
    the filter element comprising:
        an annular filter medium body surrounding a longitudinal axis, the annular filter medium body having a circumferential outer surface formed by two radially opposed longitudinal sides and two curved narrow sides, the annular filter medium body surrounding and defining a longitudinal axis;

an end disk arranged on an axial end face of the annular filter medium body, wherein the annular filter medium body surrounds in a ring shape an inwardly positioned flow space for filtered fluid;

wherein an annular gap forms an annular circumferentially extending flow path between the circumferential outer surface of the annular filter medium body and an inner side of the housing wall of the filter housing;

a cover wall arranged on and projecting radially outward away from a first portion of the outer circumference of the end disk, the cover wall closing a first portion of the annular gap between the annular filter medium body and the interior side of a housing wall of the filter housing, when in an installed state;

wherein the cover wall of the end disk projects radially outward from the end disk at a first one of the two curved narrow sides, and continues about the outer circumference end disk to project radially outward from the end disk at a portion of at least one of the two radially opposed longitudinal sides of the annular filter medium body, the cover wall configured to close a first portion of an annular circumferentially extending flow path, which is located, in the mounted state, between the outer circumference of the end disk and the interior side of the housing wall of the filter housing;

a plurality guide vanes attached onto a different second portion of the outer circumference of the end disk and positioned circumferentially away from the cover wall, the plurality guide vanes, in the mounted state, projecting into the annular circumferentially extending flow path.

2. The filter device according to claim 1, wherein the filter element with the annular filter medium body comprises an elongated cross-sectional shape and the annular circumferentially extending flow path comprises an elongated cross-sectional shape.

3. The filter device according to claim 2, wherein the cover wall covers a narrow side of the annular circumferentially extending flow path.

4. The filter device according to claim 3, wherein the cover wall covers a portion of the one of the two radially opposed longitudinal sides of the annular circumferentially extending flow path, wherein the portion of the one of the two radially opposed longitudinal sides adjoins the curved narrow side.

5. The filter device according to claim 2, wherein the two radially opposed longitudinal sides of the annular circumferentially extending flow path comprise a flat configuration.

6. The filter device according to claim 1, wherein the filter housing comprises an inflow opening, wherein the inflow opening is arranged upstream of the filter element and laterally displaced relative to a longitudinal axis, wherein the cover wall and the inflow opening are arranged at the same side of the filter housing.

7. The filter device according to claim 1, further comprising a second end disk arranged on and covering a second axial end of the annular filter medium body;

a circumferential calming wall attached onto the second end disk and arranged at or adjacent to the annular filter medium body of the filter element and extending at an inflow side of the annular filter medium body across only a portion of the circumferential outer surface of the annular filter medium body.

8. A filter element configured to be received into an interior of a filter housing, the filter element comprising:

an annular filter medium body surrounding a longitudinal axis, the annular filter medium body having an circumferential outer surface from by two radially opposed longitudinal sides and two curved narrow side;

an end disk arranged on and covering an axial end of the annular filter medium body, the end disk having:

a cover wall arranged on projecting radially outward from a first portion of an outer circumference of the end disk, the cover wall configured to close a portion of an annular gap between the annular filter medium body and an interior side of a housing wall of the filter housing, when in an installed state;

wherein the cover wall of the end disk projects radially outward from the end disk at a first one of the two curved narrow sides, and continues about the outer circumference end disk to project radially outward from the end disk on at least one of the two radially opposed longitudinal sides of the annular filter medium body, the cover wall configured to close a first portion of an annular circumferentially extending flow path, which is located, in the mounted state, between the outer circumference of the end disk and the interior side of the housing wall of the filter housing;

a plurality of guide vanes attached onto the end disk and arranged at a different second portion of the outer circumference of the end disk and positioned circumferentially away from the cover wall, the plurality guide vanes, in the mounted state, projecting into the annular circumferentially extending flow path.

* * * * *